United States Patent [19]

Thoone et al.

[11] Patent Number: 4,791,574

[45] Date of Patent: Dec. 13, 1988

[54] LAND VEHICLE NAVIGATION DEVICE COMPRISING A FILTER UNIT FOR DETERMINING AN OPTIMUM HEADING FROM PRESENTED ORIENTATION SIGNALS, AND FILTER UNIT TO BE USED IN SAID NAVIGATION DEVICE

[75] Inventors: Martinus L. G. Thoone; Henricus P. M. Krukkert, both of Eindhoven, Netherlands

[73] Assignee: U.S. Philips Corporation, New York, N.Y.

[21] Appl. No.: 899,704

[22] Filed: Aug. 25, 1986

[30] Foreign Application Priority Data

Aug. 28, 1985 [NL] Netherlands .................. 8502361
Jul. 30, 1986 [NL] Netherlands .................. 8601952

[51] Int. Cl.[4] ........................................ G01C 17/00
[52] U.S. Cl. .................................... 364/457; 364/450; 33/356
[58] Field of Search ............... 364/457, 559, 571, 447, 364/449, 450; 33/351, 352, 355 R, 356–358; 73/178 R

[56] References Cited

U.S. PATENT DOCUMENTS

| | | | |
|---|---|---|---|
| 3,911,255 | 10/1975 | Dewar et al. | 364/559 |
| 3,975,621 | 8/1976 | Fowler | 364/559 |
| 4,031,630 | 6/1977 | Fowler | 33/356 |
| 4,179,741 | 12/1979 | Rossani | 364/559 |
| 4,429,469 | 2/1984 | Tsushima et al. | 364/559 |
| 4,546,550 | 10/1985 | Marchent et al. | 33/356 |
| 4,672,565 | 6/1987 | Kumo et al. | 364/571 |

*Primary Examiner*—Parshotam S. Lall
*Assistant Examiner*—Thomas G. Black
*Attorney, Agent, or Firm*—Bernard Franzblau

[57] ABSTRACT

In a navigation device for land vehicles the orientation signal which indicates the direction of movement along which the vehicle is moving is measured on the one hand by an electronic compass. A further orientation signal is produced by the variation of the vehicle orientation as determined by wheel sensors. These two orientation signals comprise measuring errors. In order to determine an optimum value for the orientation from said values a digital filter unit is used which comprises low-pass and high-pass filters. The value for the orientation signal measured by the compass is presented to the input of the low-pass filter and the further orientation signal is presented to an input of the high-pass filter. The filter unit further comprises a control unit which generates a filter parameter from received orientation signals and supplies said filter parameter to the low-pass filter and the high-pass filter.

20 Claims, 6 Drawing Sheets

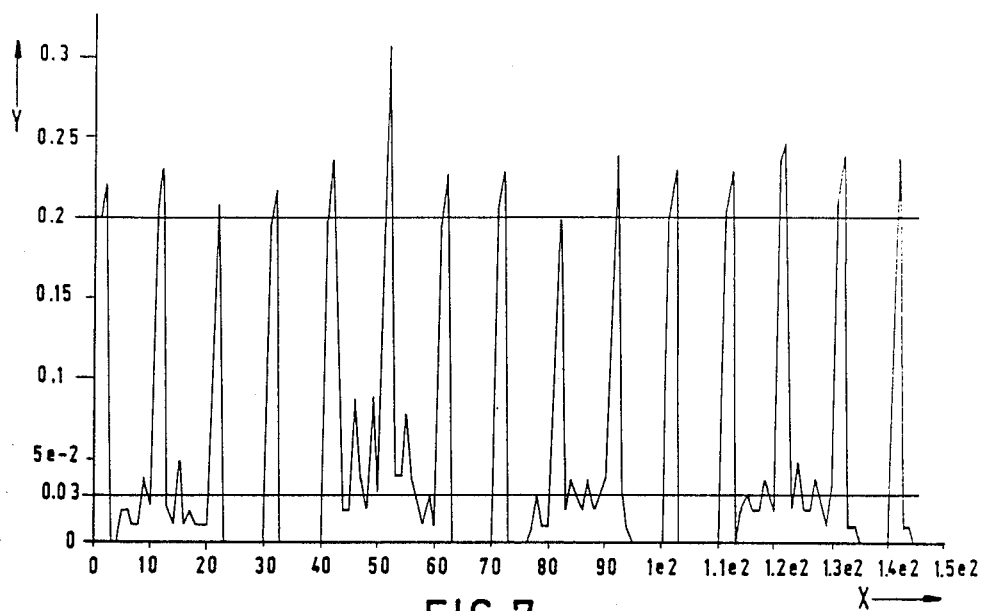
FIG. 7
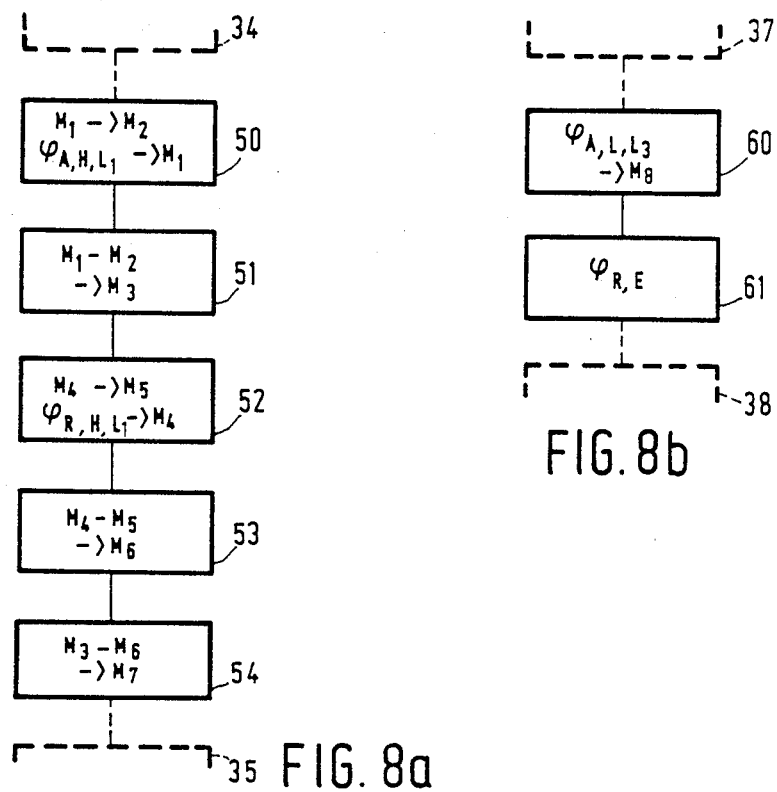
FIG. 8a
FIG. 8b

LAND VEHICLE NAVIGATION DEVICE COMPRISING A FILTER UNIT FOR DETERMINING AN OPTIMUM HEADING FROM PRESENTED ORIENTATION SIGNALS, AND FILTER UNIT TO BE USED IN SAID NAVIGATION DEVICE

BACKGROUND OF THE INVENTION

This invention relates to a navigation device for a vehicle comprising a compass for measuring the orientation of the vehicle which includes means for deriving first orientation signals by regular sampling of the measured orientation, a measuring unit to determine the variations in the orientation of the vehicle and having means for deriving second orientation signals from regularly recorded samples of the said variation of the orientation, and a digital filter unit which filters received first and second orientation signals.

Such a vehicle navigation system is known from U.S. Pat. No. 3,630,079. In the known navigation system the orientation signals are combined by means of the filter unit to determine therefrom, with greater accuracy, the orientation along which the vehicle is moving. This latter orientation is then used to determine position coordinates of the vehicle. In this known navigation device a gyro compass is used to determine the first orientation signal and the second orientation signal is derived from velocities measured by means of the Doppler effect. The known navigation devices uses a computer which processes samples of the presented signals and weights the presented signals on the basis of their error margins.

A disadvantage of the known navigation device is that it is not very suitable for use in land vehicles such as for example, motorcars or trucks. In fact the cost of a gyrocompass and of a velocity measuring unit based on the Doppler effect are high as compared with that of the land vehicle.

SUMMARY OF THE INVENTION

It is an object of the invention to provide a navigation device for land vehicles which operates with simpler and cheaper means and moreover supplies a reliable value of the vehicle orientation.

For that purpose a navigation system according to the invention is characterized in that the filter unit is incorporated in a land vehicle navigation device and comprises a first low-pass filter for filtering first orientation signals formed by the compass, which is an electronic compass, and comprises a high-pass filter for filtering the second orientation signals. The filter unit further comprises a control unit which generates a first filter parameter from the received orientation signals and supplies said first filter parameter as a control signal to the first low-pass filter and to the high-pass filter to control the filter characteristics thereof. The filter unit also comprises an output unit which is fed by the first low-pass filter and the high-pass filter to generate from the received filtered orientation signals a weighted vehicle orientation signal indicates the direction of movement of the vehicle. An electronic compass is much cheaper than a gyrocompass and provides values for the first orientation signal which are suitable for use in a land vehicle. Although the measured orientation is sensitive to disturbance peaks, the first low-pass filter is able to suppress said disturbance peaks. The second orientation signal on the contrary is sensitive to a shift of the direct current component and this is suppressed by the high-pass filter. The control unit determines the filter parameter to control the filter characteristic. As a result a navigation device is thus realised which determines with simple means a reliable value for the heading.

A first preferred embodiment of a navigation device according to the invention is characterized in that the control unit comprises a first module which derives a first distubance value by determining the high frequency components of the first orientation signal and which control unit comprises a second module which derives a second disturbance value by determining the low frequency components in the second orientation signal. The control unit also comprises a third module to determine the said first filter parameter from received first and second disturbance values. The separation of the high frequency components in the first orientation signal provides a good indication of the presence of disturbance peaks in the first orientation signal. The separation of the low frequency components from the second orientation signal gives a good indication of the shift in the direct voltage level in said signal.

A second preferred embodiment of a navigation device according to the invention is characterized in that the control unit comprises (a) a first calculating module to determine the high frequency components of the first orientation signal;

(b) a first differentiator to generate a first difference signal by each time determining the difference from successive samples of the said high frequency components of the first orientation signal;

(c) a second differentiator which receives the second orientation signals filtered by the high-pass filter and which generates a second difference signal by determining each time the difference from successive samples of the filtered second orientation signal;

(d) a second calculating module for determining a first disturbance signal on the basis of the first and the second difference signals;

(e) a third calculating module to determine the low frequency components from the first and second orientation signals and a second disturbance signal on the basis thereof; and (f) a fourth calculating module to determine the said first filter parameter from received first and second disturbance signals. By using differentiators the first disturbance signal can be determined with a greater accuracy since the good information hidden in the errors is thus recognized.

It is advanageous for the first calculating module to comprise a first sub-module to determine the said high frequency components on the basis of the difference between the first orientation signal and the filtered first orientation signal. In this manner the first low-pass filter may also be used to determine the high frequency components and one filter is saved.

It is advanageous for the first and second differentiators to each time determine the difference signal from the difference of two successive samples of received signals. The drift of the direct voltage level between two successive samples is small and thus the effect thereof on the first difference signal is also small.

BRIEF DESCRIPTION OF THE DRAWINGS

The invention will now be described in greater detail with reference to the drawing, in which:

FIG. 7 shows the behaviour of the first disturbance signal with the use of the differentiators; and FIG. 8 ($a$ and $b$) show a flow chart for determining the values $\phi_{A,E}$ and $\phi_{R,E}$.

DESCRIPTION OF THE PREFERRED EMBODIMENTS

Figure 1:
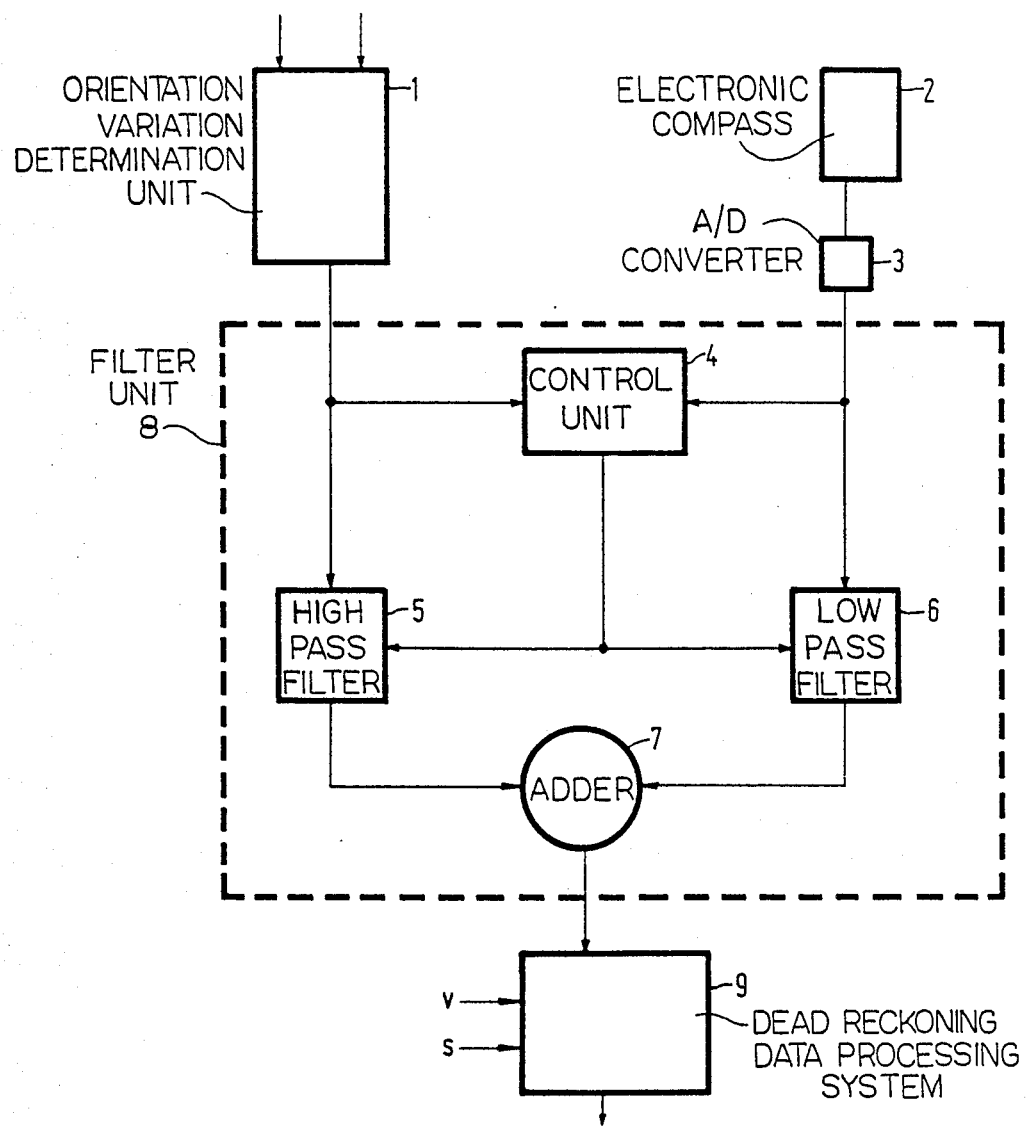
FIG. 1 shows an embodiment of a part of a naviagation device according to the invention.

FIG. 1 shows an example of a part of a vehicle navigation device for a vehicle that moves over roads on land. The vehicle navigation device comprises a filter unit 8 for determining a weighted value for the heading which indicates the direction (for example, with respect to the north) along which the vehicle is moving. Since the characterising properties of a vehicle navigation system according to the invention substantially reside in the filter unit 8, the description of the invention will be mainly directed to the description of the operation of said filter unit. An example of the operation of a complete vehicle navigation device is described, for example, in the article "EVA-Ortungs-und Navigationssystem für Landfahrzeuge" by E. P. Neukircher, O. Pilsak und D. Schlögl in Nachrichtenzeitschrift Band 36, (1983) Heft 4 pages 214–218.

The device shown in FIG. 1 comprises a unit 1 for determining variations in the orientation of the vehicle ($d\phi/dt$). In this embodiment this variation is determined on the basis of orientation data recorded, for example, by wheel sensors which are provided on a set of wheels belonging to the same shaft of the vehicle. It is described in the above article how these variations of the orientation of the vehicle and therefrom an orientation signal or heading ($\phi_R$) is determined by means of wheel sensors. The measured value, however, is inaccurate and this inaccuracy manifests itself as a drift component for which purpose the electronics necessary for determining the measured value also provide a contribution. A means to remove said drift component is the high-pass filter 5 (HPF). In fact, when drift occurs, the low frequency components are unreliable. The HPF filters said low frequency components from the signal. In the filter unit shown in FIG. 1 the orientation signal of the heading $\phi_R$, as determined by the angle measuring unit 1, is therefore presented to the HPF 5.

Another method of determining the orientation of the vehicle uses an electronic compass. An orientation signal measured by the electronic compass will be indicated as a heading $\phi_A$. The operation of an electronic compass is described, for example, in the article "Electronic Compass using a fluxgate sensor", by N. Pollock published in Wireless World October, 1982, pages 49–54. In the navigation device shown in FIG. 1 the element 2 is an electronic compass. The analog value of $\phi_A$ measured by the compass is converted by the A/D converter 3 into a digital signal which is presented to a low-pass filter (LPF) 6. In fact the signal originating from such an electronic compass comprises disturbance peaks which manifest themselves as the rapid variation of the signal as a function of the covered path and are formed as a result of local disturbances on the measured earth's magnetic field, for example, as a result of the presence along the path of steel bridges or fencings. The disturbance peaks manifest themselves as a high frequency component which can be filtered-out by means of a low-pass filter.

The filter unit 8 shown in FIG. 1 further comprises a control unit 4 to which both the headings $\phi_R$ and $\phi_A$ are presented. From these headings the control unit determines a filter parameter (L1) which gives a measure of the reliability of the two signals $\phi_R$ and $\phi_A$. Errors in $\phi_R$ result from disturbances which occur as a result of, for example, unequal tire pressure and/or wear, also of slip, if any, while the error in $\phi_A$ is determined substantially by the presence of disturbance peaks and the accuracy of the electronic compass. The control unit will be described in greater detail hereinafter. The filter parameter L1 determined by the control unit 4 is presented to the HPF 5 and the LPF 6. Outputs of the HPF and LPF, respectively, are applied to an adder unit 7 in which the output signals of the HPF and LPF are added and the result, a weighted value for the heading $\phi_{opt}$, is supplied to an input of a dead reckoning data processing system 9. Said data processing system further receives the measured velocity v and the covered path s from which, with the heading data, it determines from this received data the coordinates (x, y, z) indicating the position of the vehicle.

Figure 2:
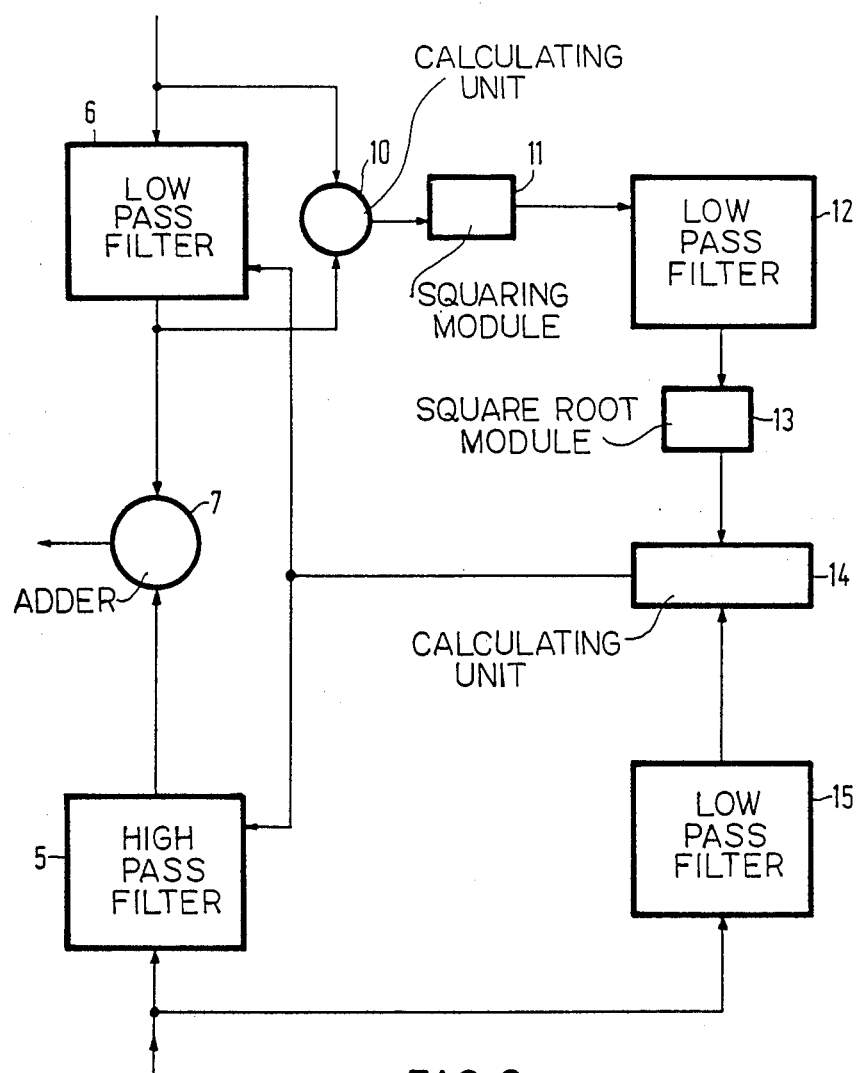
FIG. 2 shows an example of a more detailed construction of a filter unit according to the invention.

FIG. 2 shows a more detailed construction of a filter unit to be used in a vehicle navigation system according to the invention. Elements corresponding to those of FIG. 1 are referred to by the same reference numerals, for example, 5 is an HPF, 6 an LPF, and 7 an adder unit. The filter unit furthermore comprises a first calculating unit 10 to a first input of which the heading $\phi_A$ is presented and a second input of which is connected to an output of the LPF. An output of the first calculating unit 10 is connected to an input of a squaring module 11. An output of the squaring module 11 is connected to an input of a second LPF 12 having an output connected to a square root module 13. The signal determined by the square root module is presented to a first input of a second calculating unit 14.

The heading $\phi_R$ is presented to an input of a third LPF 15, an output of which is connected to a second input of the second calculating unit 14. An output of the second calculating unit 14 is connected to a control input of the LPF 6 and to a control input of the HPF 5.

The signals for the headings $\phi_R$ and $\phi_A$ are sampled. Between two successive samplings the vehicle has covered a previously determined fixed distance $\delta_n = s_n - s_{n-1}(1)(n \epsilon N)$. It is also possible, however, to sample at fixed points of time, $(t_n = n i_s)$ (2), wherein $i_s$ is a time constant.

Since there is sampled only discrete values $s_n$, $\phi_{A,n}$ and $\phi_{R,n}$ are determined for the distances and headings, respectively. $\phi_{A,n}$ and $\phi_{R,n}$ are the headings as sampled after covering a distance $n\delta_n$ or at a point of time $t_n = n i_s$. These values are valid in the s-domain. s-domain is to be understood to mean a reference system in which the abscissa represents a distance value, for example in meters, and the ordinate represents an angular value, for example, in radians. For processing these values it is necessary to perform a transformation of the s-domain to the Z-domain.

The Z-transformation for this function f is then given by $$\zeta(f_n) = \sum_{n=0}^{\alpha} f_n z^{-n}. \tag{3}$$

Further information on Z-transformations are given for example, in the book "Control System Theory" by O. I. Elgerd; Mac Graw Hill Book Company, New York 1967, p. 384, paragraph 9.4.4.

In the Z-domain is now defined:

$$\phi_A = \zeta(\phi_{A,n})$$

$$\phi_R = \zeta(\phi_{R,n})$$

Defined in the Z-domain the transformation function reads of:
(a) an LPF $$\frac{1}{1 + \frac{L_a}{\delta_n}(z-1)} \tag{4}$$

(b) an HPF $$\frac{\frac{L_a}{\delta_n}(z-1)}{1 + \frac{L_a}{\delta_n}(z-1)} \tag{5}$$

For the filtering device as shown in FIG. 2, $\delta_n$ has the meaning as given in expression (1) and the value is, for example $\delta_n = 5$ m. For the first LPF (6) and for the HPF, $L_a = L_1$ is a filter parameter. An initial value for this filter parameter is, for example, $L_1 = 50$ m, the distance covered between two successive corrections in the dead-reckoning data processing system.

For the second LPF (12), for example, $L_a = L_2 = 500$ m, a value chosen in accordance with the magnetic properties of the surroundings. For the third LPF (15), for example, $L_a = L_3 = 100$ m, a value derived from the extent of disturbance as a result of wheel drift.

When in a place $n\delta_n$, $\phi_{A,n}$ is sampled, the value $\phi_A$ is presented to the first input of the first calculating unit 10. The filtered value of $\phi_A$ as determined by the first LPF is presented to a second input of the first calculating unit. The first calculating unit determines the difference between the values presented to the inputs. This difference now gives the high frequency components of the orientation signal $\phi_A$. In fact, when the low frequency components (at the output of LPF 6) are subtracted from the signal $\phi_A$, the high frequency components are obtained. Expressed in the Z-domain this provides $$\Phi_{A,H,L1} = \Phi_A - \Phi_A \left[ \frac{1}{1 + \frac{L_1}{\delta_n}(z-1)} \right] \tag{6}$$

Since, however, an LPF is used, the signal presented to the output of LPF 6 is in fact equal to the average value ($\overline{\phi}_A$) of $\phi_A$. So in the expression (6) there is the difference between a measured value and the average value. This difference is used to determine the mean error S which is determined by $$S^2 = \frac{1}{N} \sum_{i=1}^{N} (\phi_A - \overline{\phi}_A)^2 \tag{7}$$

wherein N represents the number of measuring points. In the filter unit according to the invention the mean error is used to determine the weight factor with which the measured heading $\phi_A$ should be weighted. Said mean error in fact gives an effective value (RMS) of the disturbance on the measured signal.

For determining the average error it is necessary, as appears from expression (7), to determine the square of $(\phi_A - \overline{\phi}_A)$. For this purpose the squaring module 11 is used. The following operation considered in the Z-domain was carried out by the first calculating unit 10.

$$\Phi_{A,H,L1} = \Phi_A - \Phi_A \left[ \frac{1}{1 + \frac{L_1}{\delta_n}(z-1)} \right] \tag{8}$$

$$\Phi_{A,H,L1} \cdot \left(1 + \frac{L_1}{\delta_n}(z-1)\right) = \Phi_A \left(\frac{L_1}{\delta_n}(z-1)\right)$$

$$\Phi_{A,H,L1} \cdot \left(\frac{\delta_n}{L_1} + z - 1\right) = \Phi_A(z-1)$$

Now it applies that $$\zeta\{f_{v+1}\} = z\zeta\{f_v\} - zf_0 \tag{9}$$

The use of expression (9) in expression (8) now provides $$\zeta(\phi_{n+1}) = z\zeta(\phi_n) - z\phi_o$$

Since now $\phi_0 = 0$ (initial position)

$$\zeta(\phi_{n+1}) = z\zeta(\phi_n)$$

Expression (8), after back-transformation hence becomes $$\phi_{A,H,L1,(n)}(\delta_n L_1) + \phi_{A,H,L1,(n+1)} - \phi_{A,H,L1,(n)} = \phi_{A,n+1} - \phi_{A,n}$$

wherein $\phi_{A,H,L1}$ represents the signal at the output of the filter $$\phi_{A,H,L1,(n+1)} = \phi_{A,H,L1,(n)}(1-(\delta_n)/L_1) + \phi_{A,n+1} - \phi_{A,n} \tag{10}$$

The squaring of said expression for $\phi_{n+1}$ is now carried out by the squaring unit 11:

$$q_{n+1} = [\phi_{A,H,L1,(n+1)}]^2$$

$$q_{n+1} = [\phi_n(1-(\delta_n)/L_1) + \phi_{A,n+1} - \phi_{A,n}]^2$$

Since the mean error is given by $$S^2 = \frac{1}{N} \sum_{i=1}^{N} (\phi_A - \overline{\phi}_A)^2 \tag{7}$$

this can be determined from the average of the square, i.e.

$$S^2 = \overline{(\phi_A - \overline{\phi}_A)^2}$$

In order to determine $S^2$ use is made of a second LPF (12), for an LPF determines the average of the signal presented to its input. Considered in the Z-domain, the following operation is now carried out by LPF.

$$H = Q\left(\frac{1}{1 + \frac{L_2}{\delta_n}(z-1)}\right) \quad (12)$$

$$H\left(\left(\frac{\delta_n}{L_2}\right) + (z-1)\right) = Q\frac{\delta_n}{L_2}$$

After inverse Z-transformation $$h_n((\delta_n/L_2) + h_{n+1} - h_n = q_n(\delta_n/L_2)$$

$$h_{n+1} = h_n(1 - (\delta_n)/L_2) + q_n(\delta_n/L_2) \quad (13)$$

The signal $h_{n+1}$ produced at the output of the second LPF (12) is presented to the square root module 13. The signal at an output of the square root module is:

$$k_{n+1} = \sqrt{h_{n+1}} \quad (14)$$

This value $k_{n+1}$ then gives the effective value of the disturbance on the measured heading $\phi_A$ and forms a first disturbance value.

The determination of the extent to which the drift component influences the accuracy of the heading $\phi_R$ is done by presenting $\phi_R$ to the input of an LPF. In fact when the drift component is large, the low frequency values will be considerable and a high value will be presented to the output of the LPF. The larger the absolute value at the output of the LPF, the more unreliable is the signal $\phi_R$. For the above-mentioned reasons the signal $\phi_R$ in a filter unit according to the invention is presented to LPF 15, which LPF performs the following operation, considered in the Z-domain, to determine the second disturbance value.

$$\Phi_{R,L,L3} = \Phi_R\left(\frac{1}{1 + \frac{L_3}{\delta_n}(z-1)}\right)$$

$$\Phi_{R,L,L3}\left(\frac{\delta_n}{L_3} + z - 1\right) = \Phi_R\frac{\delta_n}{L_3}$$

After inverse Z-transformation $$\phi_{R,L,L3,(n)}(\delta_n/L_3) + \phi_{R,L,L3,(n+1)} - \phi_{R,L,L3,n} = \phi_{R,n}(\delta_n/L_3)$$

$$\phi_{R,L,L3,(n+1)} = \phi_{R,L,L3,(n)}(1 - (\delta_n)/L_3) + (\delta_n/L_3)\phi_{R,n} \quad (15)$$

The second calculating unit 14 now determines the signal $$L_1 = L_0 + \alpha k_{n+1} + \beta\phi_{R,L,L3,(n+1)} \quad (16)$$

Herein $L_0$ are a constant (for example $L_0 = 50$ m) and $\alpha$ and $\beta$ are weight factors determined by the quality of the sensors with which $\phi_A$ and $\phi_R$, respectively, have been recorded. Since a high value at the output of LPF means a great inaccurracy, a negative value is selected for $\beta$. The value $L_1$ determined by the second calculating unit is then applied to LPF 6 and HPF 5. As a result, it is possible to vary the weight factor $L_1$ for LPF 6 and HPF 5. The signals at the output of LPF 6 and HPF 5 thus are weighted signals and they are added by adder 7 and thus they constitute a signal $\phi_{opt}$ at the output of adder 7 which give an optimum value for the orientation of the vehicle. The filter unit 6 presents the possibility of determining an optimum signal from two signals affected with an inaccuracy in which, dependent on the realiability, weighting factors are determined in order to let the most reliable signal weigh heavier.

The following operation considered in the Z-domain is carried out by adder 7.

$$\Phi_{opt} = \frac{\Phi_A}{1 + \frac{L_1}{\delta_n}(z-1)} + \frac{\frac{L_1}{\delta_n}\Phi_R(z-1)}{1 + \frac{L_1}{\delta_n}(z-1)}$$

$$\Phi_{opt}\left(1 + \frac{L_1}{\delta_n}(z-1)\right) = \Phi_A + \frac{L_1}{\delta_n}\Phi_R(z-1)$$

$$\Phi_{opt}\left(\frac{\delta_n}{L_1} + z - 1\right) = \Phi_A\frac{\delta_n}{L_1} + \Phi_R(z-1)$$

After inverse Z-transformation:

$$\phi_{opt,n}(\delta_n/L_1) - 1) + \phi_{opt,n+1} = \Delta\phi_{R,n} + (\delta_n/L_1)\phi_{A,n}$$

wherein $\Delta\phi_{R,n} = \phi_{R,n+1} - \phi_{R,n}$ $$\phi_{opt,n+1} = \phi_{opt,n}(1 - (\delta_n)/L_1) + \Delta\phi_{R,n} + (\delta_n/L_1)\phi_{A,n} \quad (17)$$

The value of $\phi_{opt}$ is now used, for example in the vehicle navigation system to generate the vehicle position coordinates $$X_{n+1} = X_n + \delta_n \cos(\tfrac{1}{2})(\phi_{opt,n+1} + \phi_{opt,n})$$

$$Y_{n+1} = Y_n + \delta_n \sin(\tfrac{1}{2})(\phi_{opt,n+1} + \phi_{opt,n})$$

The filter unit shown in FIG. 2 uses discrete components. An alternative implementation of a filter unit according to the invention uses a data processor unit, for example a microprocessor, to determine $\phi_{opt}$.

Figure 3:
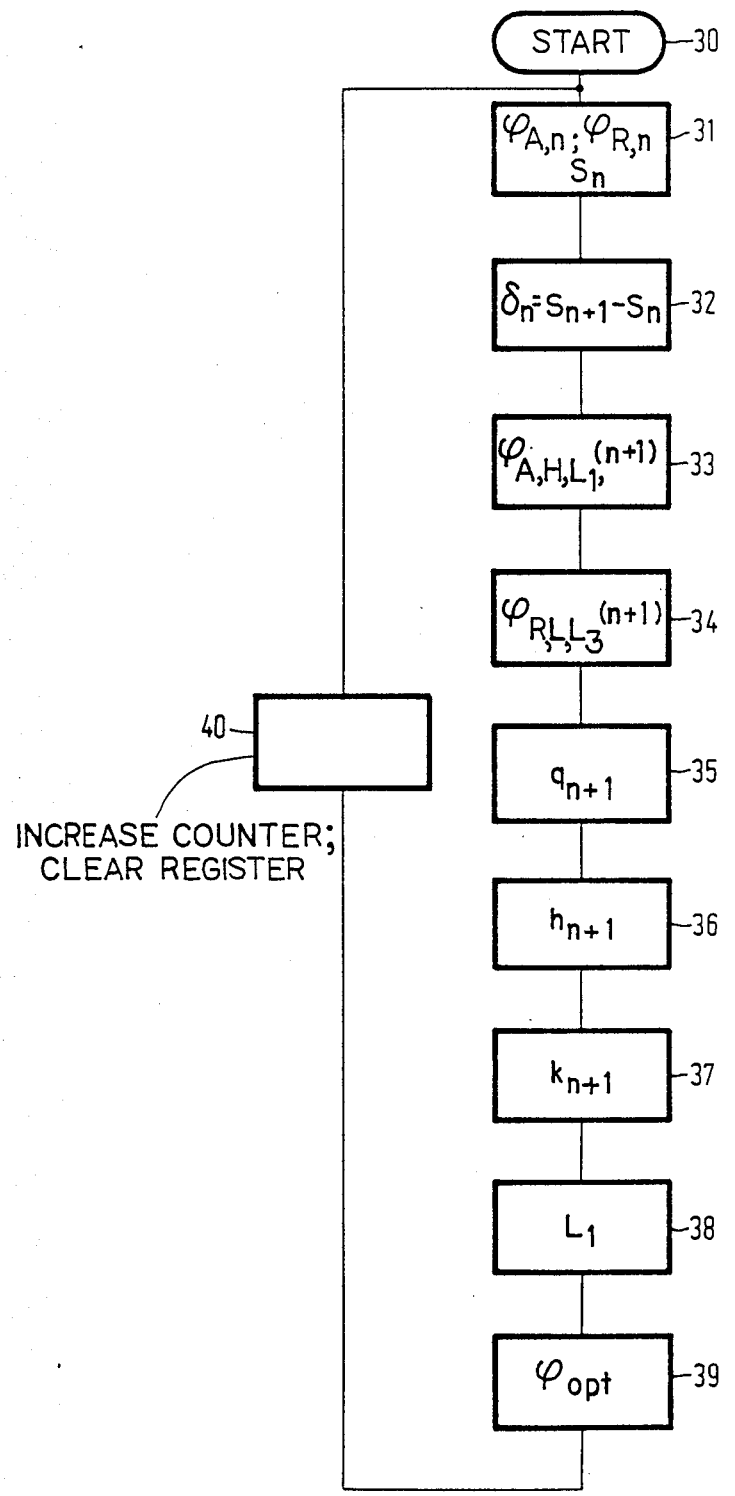
FIG. 3 shows a simplified flow chart diagram to determine an optimum value of the heading.

FIG. 3 shows a simplified flow chart of the various steps which are carried out under the control of the data processor unit to determine the value of $\phi_{opt}$. After starting (30), for example, by starting the navigation system, each time samples of $\phi_{A,n}$, $\phi_{R,n}$ and $S_n$ are measured after covering a distance $n.\delta_n$, are collected and stored in a first register (31). $\delta_n = S_{n+1} - S_n$ (32) is determined from the value of $S_{n+1}$ and $S_n$ which are both stored in the first register ($S_n$ stored during a preceding traverse of the routine, or $S_n = 0$ in the initial position).

In steps 33 to 39 the values indicated hereinafter are determined and each stored in a respective register:
step 33: $\phi_{A,H,L1,(n+1)}$ (expression 10)
step 34: $\phi_{R,L,L3,(n+1)}$ (expression 15)
step 35: $q_{n+1}$ (expression 11)
step 36: $h_{n+1}$ (expression 13)
step 37: $k_{n+1}$ (expression 14)
step 38: $L_1$ (expression 16)
step 39: $\phi_{opt}$ (expression 17).

The value of $\phi_{opt}$ is then presented to a data output of the data processor unit. A counter is then increased by one step and each time the successive data are erased from the register (40) in order to again cover the routine from step 31 for a subsequent sampling.

In the filter unit as shown in FIG. 2 the weighting factor $L_1$ is determined on the basis of the headings $\phi_A$ and $\phi_R$ by using LPF 6 in combination with calculating unit 10, as well as by using LPF 12 and LPF 15. The high frequency components for the headings $\phi_A$ as determined by LPF 6 in combination with calculating unit 10 also comprise, in addition to disturbance, good high frequency components. The lowpass filter 12, however, will now interpret the good high frequency components as disturbances so that the value of the weighting factor $L_1$ is distorted. This distortion may be removed by determining the weight factor $L_1$ on the basis of an increase or decrease in the successive sampling values for the headings $\phi_A$ and $\phi_R$.

Figure 4:
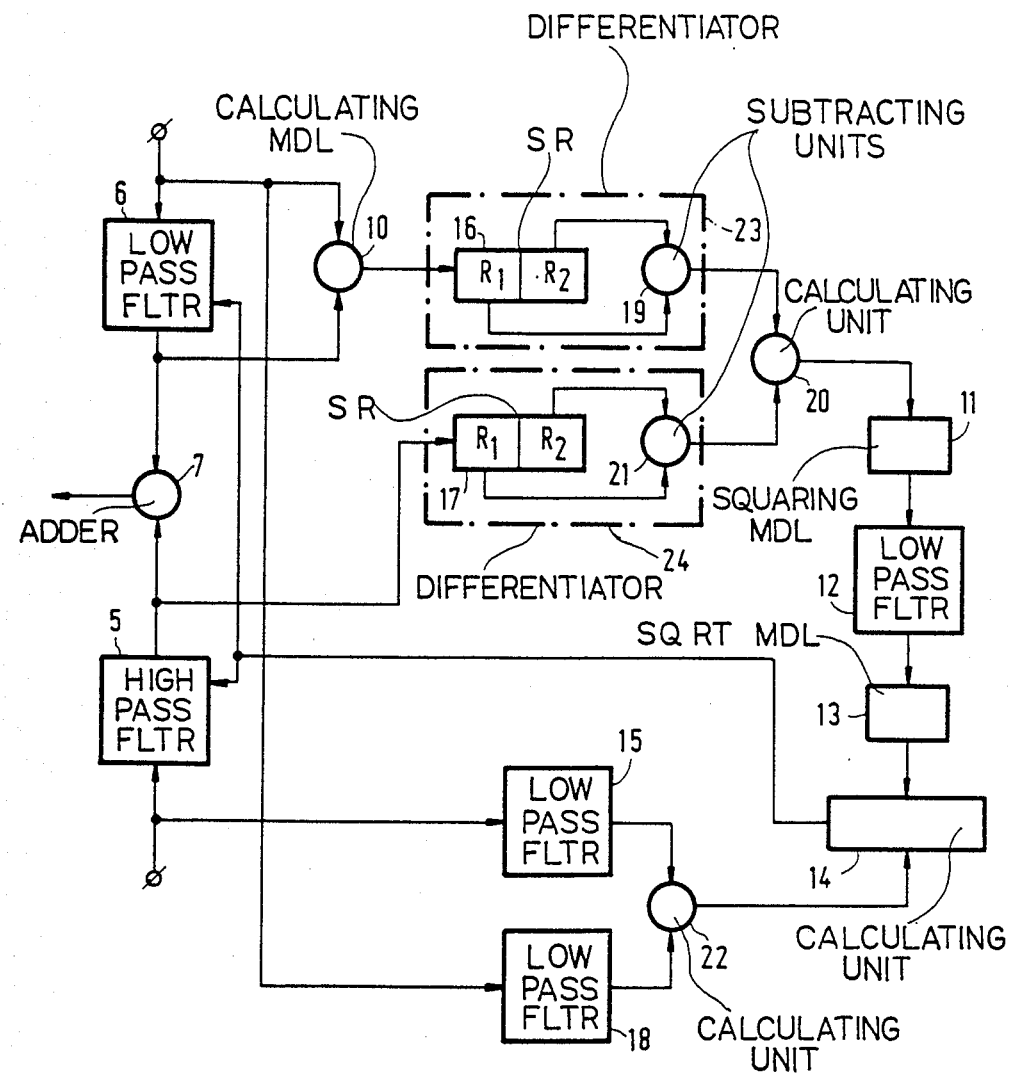
FIG. 4 shows a further embodiment of a filter unit according to the invention.

FIG. 4 shows an example of a filtering unit in which the value of the weighting factor $L_1$ is determined on the basis of the increase or decrease in the successive sampling values for the headings $\phi_A$ and $\phi_R$. Elements corresponding to those shown in FIG. 2 have the same reference numerals in FIG. 4. In the FIG. 4 filter unit the output of the first calculating module 10 is connected to an input of a first differentiator 23 whose output is connected to a first input of a third calculating unit 20. An output of the high-pass filter 5 is connected to an input of a second differentiator 24 whose output is connected to a second input of the third calculating unit 20. An output of the third calculating unit is connected to an input of the squaring module 11.

The first and second differentiators (23, 24) determine the difference between two successively presented samplings ($P_n$, $P_{n+1}$; $P_{n+1}-P_n$). For this purpose, for example, the differentiators comprise shift registers (16, 17) and a subtracting unit (19, 21) connected thereto. Each shift register comprises a first ($R_1$) and a second ($R_2$) sub-register. When a sample $P_{n+1}$ is presented to the shift register, the value $P_n$ stored in the sub-register $R_1$ is shifted to $R_2$ and the value $R_{n+1}$ is stored in $R_1$. After this operation the values $P_{n+1}$ and $P_n$ are presented to the respective inputs of the subtracting units so as to determine the value $P_{n+1}-P_n$.

The sampled signals for the heading $\phi_{R,H,L1}$ after having passed the HPF 5 are presented to the second differentiator 24. This second differentiator determines a second difference signal by performing the following operation:

$$\phi_{R,H,L1,(n+1)} - \phi_{R,H,L1,(n)} = \Delta\phi_{R,H,L1} \tag{18}$$

$$\Delta\phi_{R,H,Ln} = -(\delta_n/L_1)\phi_{R,H,L1(n)} + \phi_{R,n+1} - \phi_{R,n} \tag{19}$$

By determining the difference between successive samples, the disturbance introduced by the wheel drift (in fact $\phi_R$ was determined by means of wheel sensors) is substantially eliminated. The disturbance introduced by the wheel drift is expressed in a shift of the direct voltage level of the measured values. By subtracting successive sampling values from each other, said shift in the direct voltage level is eliminated. Preferably directly succeeding sampling values are subtracted from each other. In fact, when the successive samplings follow each other rapidly ($\delta_n = 5$ m), the variation in the direct voltage level between these two successive samples is minimum. For this purpose, only two sub-registers are necessary also for the register 17. It will be obvious, however, that alternative solutions are also possible, for example, $\phi_{R,H,L1,(n+2)} - \phi_{R,H,L1,(n)}$ but these provide no improvement, quite the reverse.

Since the second difference signal $\Delta\phi_{R,H,L}$ as determined by means of the second differentiator is used for the heading $\phi_R$, it is also necessary in order to determine a feasible value for the filter parameter $L_1$ to determine a first difference signal $\Delta\phi_{A,H,L1}$ for the heading $\phi_A$. For this purpose, the filter unit comprises a first differentiator 23 which performs the following operation on the sampled signals for the heading $\phi_{A,H,L1}$ $$\phi_{A,H,L1,(n+1)} - \phi_{A,H,L1,(n)} = \Delta\phi_{A,H,L1} \tag{20}$$

Substitution of (10) in (20) provides:

$$\Delta\phi_{A,H,L1} = -(\delta_n/L_1)\phi_{A,H,L1,(n)} + \phi_{A,n} - \phi_{A,n} \tag{21}$$

The difference signals $\Delta\phi_{A,H,L1}$ and $\Delta\phi_{R,H,L1}$ are presented to the third calculating unit 20 which then performs the following operation in order to determine a first disturbance signal $\phi_{A,E}$.

$$\phi_{A,E} = \Delta\phi_{A,H,L1} - \Delta\phi_{R,H,L1} \tag{22}$$

Substitution of 21 and 19 in 22 provides:

$$\phi_{A,E} = (\delta_n/L_1)(\phi_{A,H,L1,(n)} - \phi_{R,H,L1,(n)}) + (\phi_{A,n+1} - \phi_{R,n+1}) + (\phi_{R,n} - \phi_{A,n}) \tag{23}$$

The first disturbance signal $\phi_{A,E}$ now gives information on the disturbance which is present on the measured value of $\phi_A$. In fact the HPF 5 and the second differentiator 24 have removed the disturbances from the measured values for the heading $\phi_R$ so that $\Delta\phi_{R,H,L1}$ may be considered as substantially disturbance-free, $\Delta\phi_{R,H,L1}$ thus is reliable value. Assuming that $\Delta\phi_{A,H,L1}$ is also substantially disturbance-free, the value $\phi_{A,E}$ must be substantially equal to zero, for $\phi_A$ and $\phi_R$ of course represent the same heading. The deviation between $\phi_A$ and $\phi_R$ is given by the amount of disturbance on said samples. Since $\Delta\phi_{R,H,L1}$ is considered to be reliable, the amount which $\phi_{A,E}$ differs from zero gives a degree of the error on the measured value for $\phi_A$.

The detection of the wheel sensor drift present on the presented samples for the heading $\phi_R$ is done by using the LPF's 15 and 18 and the calculating unit 22. The heading $\phi_A$ now comprises a low frequency disturbance component as a result of drift when a regression circle is used to eliminate said drift component in $\phi_A$. The use of a regression circle is described, for example, in U.S. Pat. No. 4,414,753. By using such a regression circle the low frequency components of the heading $\phi_A$ comprise reliable information. A disturbance in the heading $\phi_R$ can now be detected by comparing the low frequency components of $\phi_R$ and $\phi_A$. For this purpose the fourth low-pass filter 18 is incorporated in the filter unit. The measured sampling value of the heading $\phi_A$ is presented to an input of said fourth LPF. This fourth LPF operates with the same filter parameter $L_3$ as the third LPF 15. The outputs of the third and the fourth LPF's, respectively, are connected to respective inputs of a fourth calculating unit 22, whose output is connected to an input of the second calculating unit 14. That LPF 15 and LPF 18 operate with the same filter parameter $L_3$ is necessary in connection with the fact that the samples of both $\phi_A$ and $\phi_R$ should be filtered with the same filter parameter to determine the difference between the two filtered samplings by the fourth calculating unit 22. The calculating unit 22 performs the following operations, considered in the Z-domain, in order to determine a second disturbance signal $$\phi_{R,E} = [\Phi_R - \Phi_A]\left[\frac{1}{1 + \frac{L_3}{\delta_n}(z-1)}\right] \quad (24)$$

$$\phi_{R,E} = \left(1 - \frac{\delta_n}{L_3}\right)(\phi_{R,L,L_3,n} - \phi_{A,L,L_3,n}) + \frac{\delta_n}{L_3}(\phi_{R,n} - \phi_{A,n}) \quad (25)$$

Figure 5:
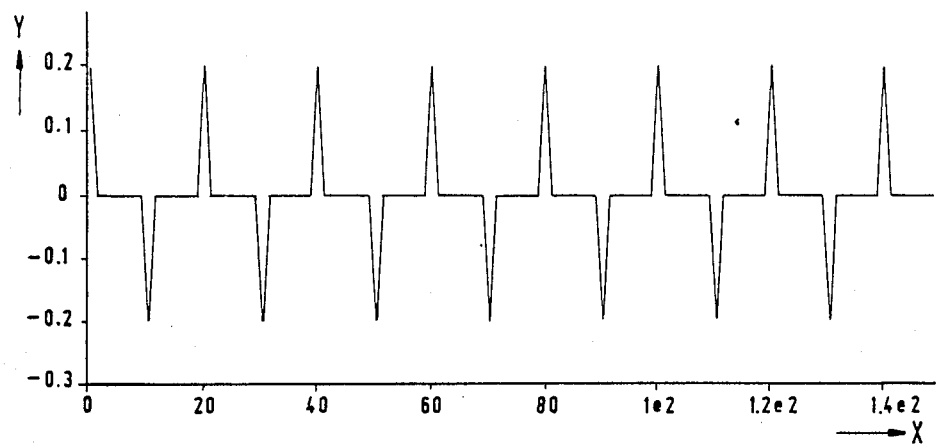
FIG. 5 shows the behaviour of a simulated disturbance.

In order to illustrate the operation of a filter unit shown in FIG. 4 and notably to explain the advantage of the use of the differentiators 23 and 24, a disturbance on the heading $\phi_A$ is simulated. The behaviour of said disturbance is shown in FIG. 5. The value (in radians) of the heading is shown on the Y-axis and the covered path is shown on the X-axis.

Figure 6:
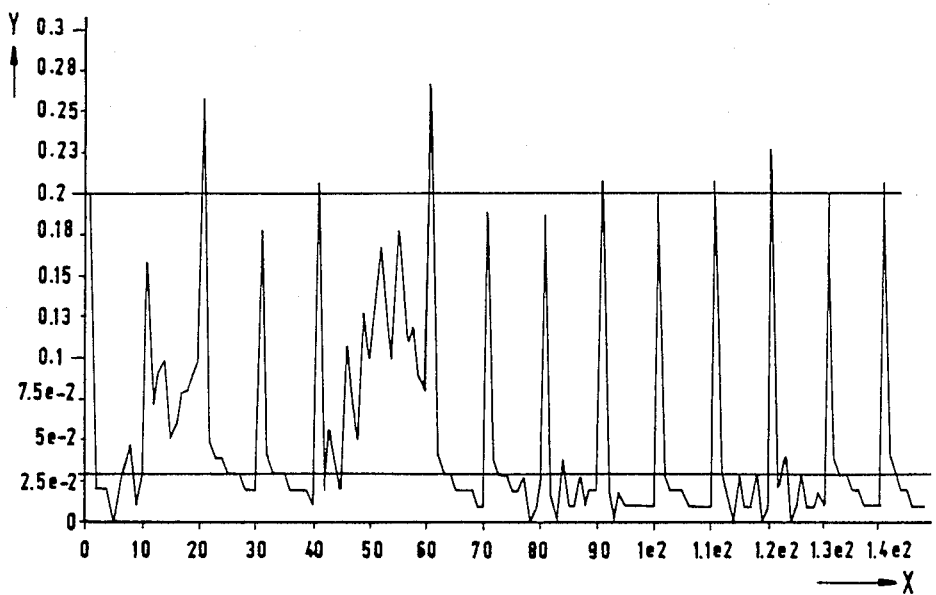
FIG. 6 shows the behaviour of the first disturbance signal without using the differentiators.

FIG. 6 shows a graph in which the covered path is again plotted on the X-axis and the value $\phi'_{A,E} = \phi_{A,H,L_1} - \phi_{R,H,L_1}$ on the Y-axis.

This value $\phi_{A,E}$ is obtained by using the differentiators 23 and 24. This graph shows clearly that the disturbance provided on $\phi_A$, mainly for small values of X, so in the initial stage is still recognized insufficiently by the filter unit.

This notably can be recognized by the irregular pattern of the graph mainly in the initial stage. In fact in said initial stage the value of the filter parameter $L_1$ is still too inaccurate so that the adjustment of the filters 5 and 6 is still insufficiently accurate and thus $\phi_{R,H,L_1}$ and $\phi_{A,H,L_1}$ still comprise disturbance contributions which are included in the determination of $\phi_{A,E}$.

FIG. 7 shows a graph in which the values $\phi_{A,E}$ are plotted on the Y-axis. These values for $\phi_{A,E}$ are obtained by using the differentiators 23 and 24. It will be obvious from said graph that the disturbance on $\phi_A$ is recognized and the wheel drift contribution has been filtered out even in the initial stage when the filter parameter $L_1$ is still not known with sufficient accuracy. This graph thus illustrates the advantage of the use of the differentiators.

The values for $\phi_{A,E}$ and $\phi_{R,E}$ can also be determined by using a program which is intended for that purpose and which can be handled by means of a data processing unit. FIG. 8 (a and b) shows an example of a flow chart for a program with which the values $\phi_{A,E}$ and $\phi_{R,E}$ can be determined. This program comprises two subroutines, a first (FIG. 8a) for determining $\phi_{A,E}$ which can be inserted between the steps 34 and 35 of the program shown in FIG. 3, and a second (FIG. 8b) for determining $\phi_{R,E}$ which can be inserted between the steps 37 and 38 of the program shown in FIG. 3. The following operations are carried out in the various steps of said subroutines.

(A) FIG. 8a:

50 $M_1 \rightarrow M_2$ $\phi_{A,H,L_1} \rightarrow M_1$ The new value determined by $\phi_{A,H,L_1}$ (step 33) is stored in a register $M_1$ after the value present there was transferred to a register $M_2$.

51 $M_1 - M_2 \rightarrow M_3$ The difference between the values stored in the registers $M_1$ and $M_2$ is determined and stored in a register $M_3$ (expression 21).

52 $M_4 \rightarrow M_5$ $\phi_{R,H,L_1} \rightarrow M_4$ The new value determined for $\phi_{R,H,L_1}$ (step 34) is stored in a register $M_4$ after the value present there was transferred to a register $M_5$.

53 $M_4 - M_5 \rightarrow M_6$ The difference between the values stored in the registers $M_4$ and $M_5$ is determined and stored in a register $M_6$ (expression 19).

54 $M_3 - M_6 \rightarrow M_7$ The difference between the values stored in the registers $M_3$ and $M_6$ is determined and stored in a register $M_7$ (expression 23).

The value $\phi_{A,E}$ is now stored in the register $M_7$.

(B) FIG. 8b:

60 $\phi_{A,L,L_3} \rightarrow M_8$ The values $\phi_{A,L,L_3}$ are determined. They are the low frequency components of the samples for the heading $\phi_A$ (filter parameter $L_3$; LPF 18). The successive values $\phi_{A,L,L_3}$ are each time stored in a register $M_8$.

61 $\phi_{R,E}$ Expression 25 is calculated on the basis of the values stored in $M_8$ and the values determined in step 38.

What is claimed is:

1. A navigation device for a land vehicle comprising: an electronic compass for measuring the orientation of the vehicle and adapted to produce a first orientation signal by regular sampling of the measured orientation, a measuring unit operating independently of said compass for determining variations in the orientation of the vehicle and adapted to produce second orientation signals from regularly measured samples of the variations in the orientation, and a digital filter unit adapted to filter received first and second orientation signals, wherein the filter unit comprises a first low-pass filter for filtering first orientation signals received from the electronic compass, a high-pass filter for filtering the second orientation signals received from the measuring unit, a control unit which receives the first and second orientation signals and generates and supplies a first filter parameter control signal to the first low-pass filter and to the high-pass filter to control the filter characteristics thereof, and an output unit responsive to filtered orientation output signals of the first low-pass filter and the high-pass filter to produce from said received filtered orientation signals a weighted vehicle orientation signal which indicates the direction of movement of the vehicle.

2. A navigation device as claimed in claim 1, wherein the sampling of the first and second orientation signals is carried out each time that the vehicle has covered a predetermined distance.

3. A filter unit to be used in a navigation device of the type described in claim 1, wherein the filter unit comprises a first low-pass filter for filtering first orientation signals generated by the compass and a high-pass filter for filtering the second orientation signals, and wherein the first low-pass filter and the high-pass filter are controlled by said first filter parameter determined by the control unit.

4. A navigation device as claimed in claim 1, wherein the control unit comprises:

(a) a first calculating module for determining the high frequency components of the first orientation signal;

(b) a first differentiator coupled to an output of the first calculating module to derive a first difference signal by determining the difference of successive samples of the high frequency components of the first orientation signal;

(c) a second differentiator coupled to the high-pass filter to receive the second orientation signals filtered by the high-pass filter and which derives a second difference signal by determining the difference of successive samples of the filtered second orientation signal;

(d) A second calculating module for deriving a first disturbance signal in response to the first and the second difference signals;

(e) a third calculating module for deriving the low frequency components of the first and second orientation signals and producing a second disturbance signal on the basis thereof; and (f) A fourth calculating module for determining the said first filter parameter signal from received first and second disturbance signals.

5. A navigation device as claimed in claim 4, wherein the fourth calculating module comprises: a squaring module for squaring the first disturbance signal, a second low-pass filter for filtering the squared first disturbance signal, wherein the filter characteristic of the second low-pass filter can be controlled by a second filter parameter, a square root module for determining the square root of a filtered output signal of the second low-pass filter, and an adding unit for determining the first filter parameter signal by adding an output signal supplied by the square root module and the second disturbance signal.

6. A navigation device as claimed in claim 4, wherein the first calculating module comprises a first sub-module for determining the said high frequency components by finding the difference between the first orientation signal and a filtered first orientation signal at the output of the first low-pass filter.

7. A navigation device as claimed in claim 6, wherein the first and second differentiators each time determine the difference signals from the difference of two successive samples of received orientation signals.

8. A navigation device as claimed in claim 6 wherein the second calculating module includes means for subtracting the first and second difference signals to derive the first disturbance signal.

9. A navigation device as claimed in claim 4, characterized in that the third calculating module comprises second and third low-pass filters for determining the low frequency components of the first and second orientation signals, wherein the filter characteristic of the second and third low-pass filters is controlled by a third filter parameter.

10. A navigation device as claimed in claim 4, wherein the second calculating module derives the first disturbance signal by subtracting the first and second difference signals.

11. A navigation device as claimed in claim 4 wherein the first and second differentiators each determine the difference signals from the difference of two successive samples of received orientation signals.

12. A navigation device as claimed in claim 4 wherein the third calculating module comprises second and third low-pass filters responsive to the first and second orientation signals for deriving signals determined by the low-frequency components of the first and second orientation signals.

13. A navigation device as claimed in claim 1 wherein the control unit comprises: a first module responsive to the first orientation signal for deriving a first disturbance value by determining the high frequency components of the first orientation signal, a second module responsive to the second orientation signal for deriving a second disturbance value by determining the low frequency components in the second orientation signal, and a third module coupled to outputs of the first and second modules to determine said first filter parameter signal from received first and second disturbance values.

14. A navigation device as claimed in claim 2, wherein the first module comprises a calculating unit having first and second inputs which receive said first orientation signal and an output signal of said first low-pass filter, respectively, thereby to determine the high frequency components of the first orientation signal by taking the difference between the first orientation signal and the output signal of the first low-pass filter, and wherein the third module comprises: a first sub-module for squaring the first disturbance value, a second low-pass filter coupled to said first sub-module for transforming a squared first disturbance value into an output signal, wherein the filter response characteristic of the second low-pass filter is controlled by a second filter parameter, a square root module coupled to an output of the second low-pass filter for determining the square root of said output signal of the second low-pass filter, and an adder unit coupled to said square root module and said second module for determining the first filter parameter by ading the second disturbance value and a value, weighted with a previously determined weight factor, supplied by the square root module.

15. A navigation device as claimed in claim 13 wherein the first module comprises a calculating unit having first and second inputs which receive said first orientation signal and an output signal of said low-pass filter, respectively, thereby to derive a first disturbance value signal determined by the high frequency components of the first orientation signal by taking the difference between the first orientation signal and the output signal of the first low-pass filter, means coupled to an output of the calculating unit for squaring the first disturbance value signal, a second low-pass filter responsive to a squared first disturbance value signal at an output of the squaring means to produce a filter output signal, and a square root module responsive to said filter output signal to derive said first disturbance value.

16. A land vehicle comprising a navigation device as defined in claim 1, wherein the land vehicle comprises the electronic compass, the measuring unit and the filtering unit.

17. A land vehicle navigation device comprising:
an electronic compass including a first sampling device for producing first orientation signals by regular sampling of vehicle orientation measured by said electronic compass;
a measuring unit operating independently of said compass for determining variations in the vehicle orientation, said measuring unit including a second sampling device for producing second orientation signals by regular sampling of variations in the vehicle orientation determined by said measuring unit; and
a digital filter unit comprising:
a control unit having an input for receiving said first and second orientation signals and means for producing in response to the received orientation signals a first filter parameter signal;

a first low-pass filter and a high-pass filter each having a signal input for receiving said first and second orientation signals, respectively, and having a parameter input for receiving said first filter parameter signal, said filters being operative to transform said received orientation signals into respective output signals in accordance with a frequency response characteristic controllable by said filter parameter signal;

combination means for deriving a weighted vehicle orientation signal indicating vehicle direction of movement by combining said output signals of said first low-pass filter and said high-pass filter; and means responsive to said weighted vehicle orientation signal for determining vehicle position coordinates.

18. A land vehicle navigation device as claimed in claim 17 wherein said control unit comprises:

a first module having a first input for receiving said first orientation signal, said first module deriving a first disturbance value signal by determining the high frequency components of the first orientation signal;

a second module having a second input for receiving said second orientation signal, said second module deriving a second disturbance value signal by determining the low frequency components in said second orientation signal; and a third module connected to said first and said second modules for determining said first filter parameter signal from received first and second disturbance value signals.

19. A land vehicle navigation device as claimed in claim 18, wherein said first module comprises a calculating unit connected to said first module input and having a third input for receiving said output signal of said first low-pass filter, said calculating unit deriving said first disturbance value signal by taking the difference between said first orientation signal and the output signal of said first low-pass filter, and wherein said third module comprises:

a first sub-module coupled to said calculating unit for squaring said first disturbance value signal;

a second low-pass filter connected to said first sub-module for transforming a squared first disturbance value signal into an output value signal in accordance with a frequency response controllable by a second predetermined filter parameter signal;

a square root module connected to said second low-pass filter for determining the square root of said output value signal of said second low-pass filter; and an adder coupled to said square root module and said second module for producing said first filter parameter signal by adding the second disturbance value signal with a value signal, weighted with a previously determined weight factor, outputted by said square root module.

20. A land vehicle navigation device as claimed in claim 17 wherein said position coordinate determining means comprises a data processor having input means that receive a measured vehicle velocity signal and a traversed path distance signal.

* * * * *